(12) United States Patent
Mistratov et al.

(10) Patent No.: US 10,050,996 B1
(45) Date of Patent: Aug. 14, 2018

(54) METHODS AND SYSTEMS FOR PERFORMING DYNAMIC RISK ANALYSIS USING USER FEEDBACK

(71) Applicant: Google LLC, Mountain View, CA (US)

(72) Inventors: Aleksandr Mistratov, San Francisco, CA (US); Daniel Margolis, Zurich (CH); Michael C. Hearn, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/688,277

(22) Filed: Aug. 28, 2017

Related U.S. Application Data

(62) Division of application No. 14/023,829, filed on Sep. 11, 2013, now Pat. No. 9,781,152.

(51) Int. Cl.
*H04L 29/06* (2006.01)
(52) U.S. Cl.
CPC .............................. *H04L 63/1441* (2013.01)
(58) Field of Classification Search
None
See application file for complete search history.

(56) References Cited

U.S. PATENT DOCUMENTS

| | | | |
|---|---|---|---|
| 8,312,540 B1 | 11/2012 | Kahn et al. | |
| 2003/0208684 A1* | 11/2003 | Camacho | G06F 21/32 713/186 |
| 2005/0097320 A1 | 5/2005 | Golan et al. | |
| 2007/0186282 A1 | 8/2007 | Jenkins | |
| 2008/0101597 A1 | 5/2008 | Nolan et al. | |
| 2010/0017476 A1 | 1/2010 | Shue et al. | |
| 2010/0100962 A1 | 4/2010 | Boren | |
| 2011/0185401 A1* | 7/2011 | Bak | G06F 17/30958 726/5 |
| 2011/0302087 A1 | 12/2011 | Crooks | |
| 2012/0158626 A1 | 6/2012 | Zhu et al. | |
| 2013/0097701 A1 | 4/2013 | Moyle et al. | |

* cited by examiner

*Primary Examiner* — David Le
(74) *Attorney, Agent, or Firm* — Lerner, David, Littenberg, Krumholz & Mentlik, LLP

(57) ABSTRACT

A method of verifying an account login request may include identifying one or more Internet Protocol (IP) addresses as potentially malicious and, for each identified IP address, determining a first value equal to a number of times over a period of time that the IP address was identified by the computing device as potentially malicious, determining a second value equal to a number of times over the period of time that the IP address was confirmed to be potentially malicious by one or more account users, determining a proportion value associated with the IP address by determining a ratio of the second value to the first value, labeling the IP address as safe or unsafe based on at least the proportion value associated with the IP address, and maintaining, by the computing device, a list of the IP addresses and corresponding labels.

8 Claims, 4 Drawing Sheets

METHODS AND SYSTEMS FOR PERFORMING DYNAMIC RISK ANALYSIS USING USER FEEDBACK

RELATED APPLICATION

This application claims priority and is a divisional of U.S. patent application Ser. No. 14/023,829 filed Sep. 11, 2013, entitled Methods and Systems for Performing Dynamic Risk Analysis Using User Feedback, the disclosure of which is incorporated herein by reference in its entirety.

BACKGROUND

Risk analysis systems are likely to commit certain errors such as, for example, rejecting a valid user's login attempts (Type I errors) or authorizing malicious login attempts (Type II errors). Type I errors may occur when a user logs into an account from an unrecognized location that is atypical of the user's prior login history. Type II errors may occur when hijackers successfully mimic a user's login patterns.

Risk analysis systems commonly do not learn from their mistakes, and a similar set of valid logins may be persistently and incorrectly evaluated as risky while another set of malicious logins may be continuously accepted.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of verifying an account login request may include identifying, by a computing device, one or more Internet Protocol (IP) addresses as potentially malicious. One or more login requests may be made from the one or more IP addresses. The method may include, for each identified IP address, determining a first value equal to a number of times over a period of time that the IP address was identified by the computing device as potentially malicious, determining a second value equal to a number of times over the period of time that the IP address was confirmed to be potentially malicious by one or more account users, determining a proportion value associated with the IP address by determining a ratio of the second value to the first value, labeling the IP address as safe or unsafe based on at least the proportion value associated with the IP address, and maintaining, by the computing device, a list of the IP addresses and corresponding labels.

In an embodiment, a method of verifying an account login request may include identifying, by a computing device, one or more Internet Protocol (IP) addresses as potentially malicious. One or more login requests for one or more accounts may be made from the one or more IP addresses. The method may include for each identified IP address, determining a first value equal to a number of times over a period of time that a challenge presented to a user associated with the IP address was successfully completed, determining a second value equal to a total number of times over the period of time that a challenge was presented to the user, determining a proportion value associated with the IP address by determining a ratio of the second value to the first value, labeling the IP address as safe or unsafe based on at least the proportion value associated with the IP address, and maintaining, by the computing device, a list of the IP addresses and corresponding labels.

In an embodiment, a system of verifying an account login request may include a computing device and a computer-readable storage medium in communication with the computing device. The computer-readable storage medium may include one or more programming instructions that, when executed, cause the computing device to identify one or more Internet Protocol (IP) addresses as potentially malicious. One or more login requests may be made from the one or more IP addresses. The computer-readable storage medium may include one or more programming instructions that, when executed, cause the computing device to, for each identified IP address, determine a first value equal to a number of times over a period of time that the IP address was identified by the computing device as potentially malicious, determine a second value equal to a number of times over the period of time that the IP address was confirmed to be potentially malicious by one or more account users, determine a proportion value associated with the IP address by determining a ratio of the second value to the first value, label the IP address as safe or unsafe based on at least the proportion value associated with the IP address, and maintain a list of the IP addresses and corresponding labels.

In an embodiment, a system of verifying an account login request may include a computing device and a computer-readable storage medium in communication with the computing device. The computer-readable storage medium may include one or more programming instructions that, when executed, cause the computing device to identify, by a computing device, one or more Internet Protocol (IP) addresses as potentially malicious. One or more login requests for one or more accounts may be made from the one or more IP addresses. The computer-readable storage medium may include one or more programming instructions that, when executed, cause the computing device to, for each identified IP address, determine a first value equal to a number of times over a period of time that a challenge presented to a user associated with the IP address was successfully completed, determine a second value equal to a total number of times over the period of time that a challenge was presented to the user, determine a proportion value associated with the IP address by determining a ratio of the second value to the first value, label the IP address as safe or unsafe based on at least the proportion value associated with the IP address, and maintain a list of the IP addresses and corresponding labels.

DETAILED DESCRIPTION

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

Figure 1:
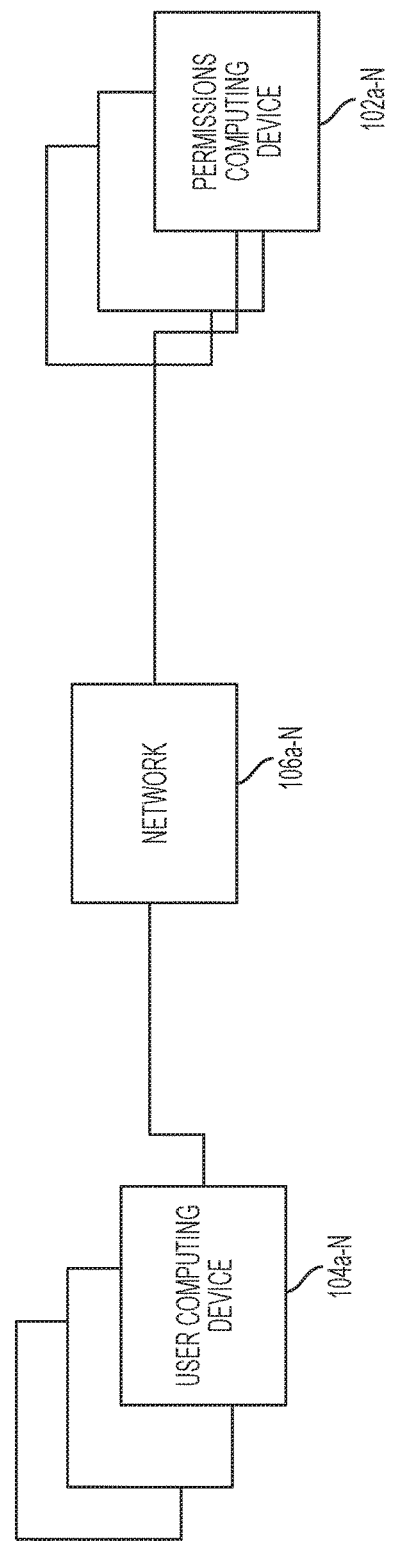
FIG. 1 illustrates a block diagram of an example risk analysis system according to an embodiment.

FIG. 1 illustrates a block diagram of an example risk analysis system according to an embodiment. As illustrated by FIG. 1, a risk analysis system 100 may include one or more permission computing devices 102a-N in communication with one or more user computing devices 104a-N via one or more networks 106a-N.

In an embodiment, a user may register for an online account such as, for example, an email account or a social networking account. As part of the registration process, the user may create account access information such as a username, a password, one or more security questions, and/or the like. A permissions computing device 102a-N may validate account access information received from one or more user computing devices 104a-N.

A user computing device 104a-N may be a computing device associated with a user, such as, for example, an online service account user and/or the like. Examples of user computing devices 104a-N may include, without limitation, a laptop computer, a desktop computer, a tablet, a mobile computing device and/or the like.

In an embodiment, a communication network 106a-N may be a local area network (LAN), a wide area network (WAN), a mobile or cellular communication network, an extranet, an intranet, the Internet and/or the like. In an embodiment, a communication network 106a-N may provide communication capability between one or more permissions computing devices 102a-N and one or more user computing devices 104a-N.

Figure 2:
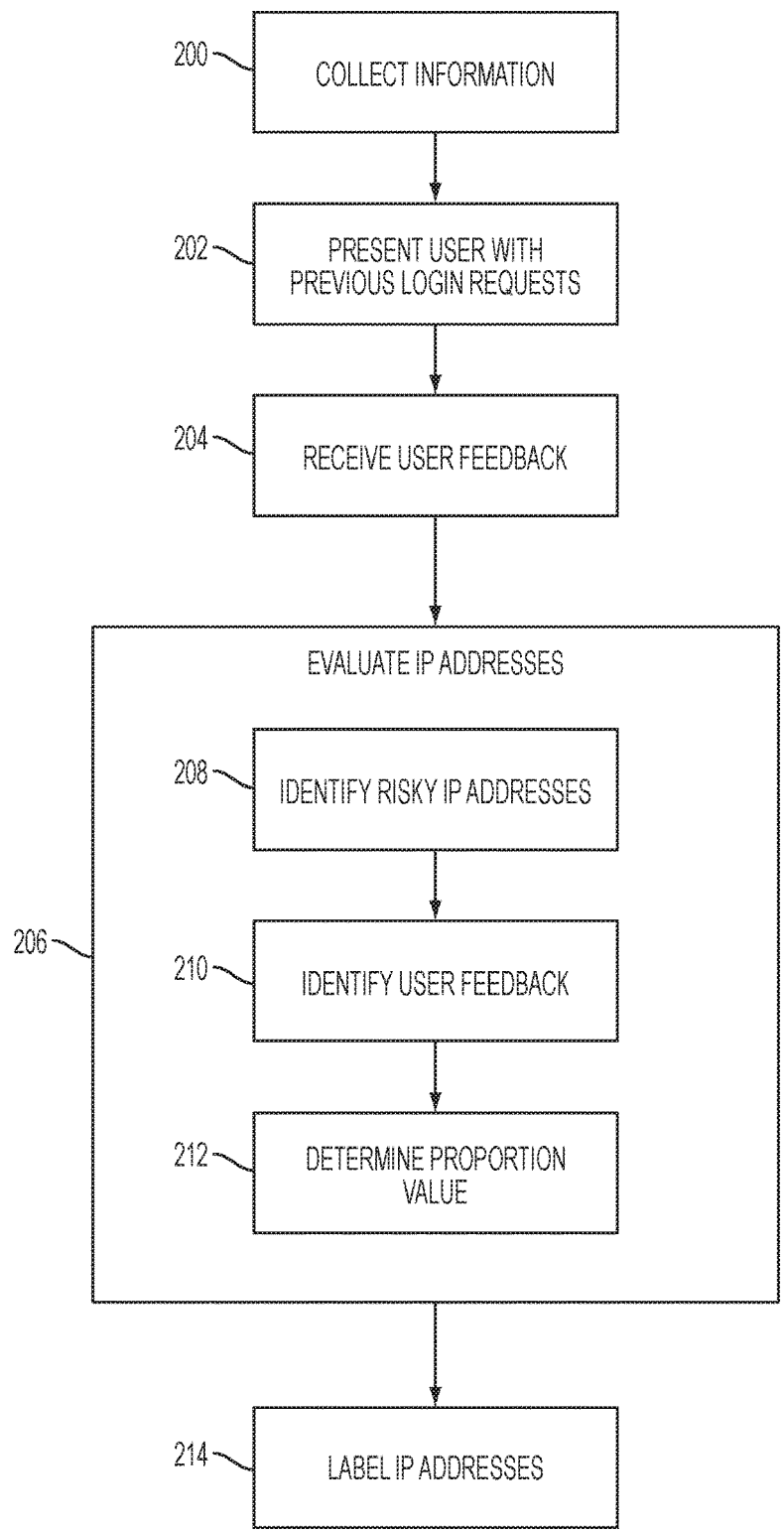
FIG. 2 illustrates a flow chart of an example method of verifying an account login request according to an embodiment.

FIG. 2 illustrates a flow chart of an example method of verifying an account login request according to an embodiment. As illustrated by FIG. 2, information associated with each login request to a user's account may be collected 200 and maintained in a record associated with the account. Such information may include, without limitation, the Internet Protocol (IP) address from which the request is made, a timestamp associated with the request, and a domain name associated with the request. The information may also include an indication of whether the system evaluated the login request as risky. According to an embodiment, login requests identified as risky may be denied.

In an embodiment, a request may be identified as risky if it has one or more characteristics indicative of account hijacking, hacking activities or other potentially malicious behaviors. For example, a request may be identified as risky if it originates from a new or unrecognized location—i.e., a location from which the account has not previously been accessed. Locations may be determined based on IP addresses, network addresses, or other criteria. If a request originates outside of a geographic area associated with one or more past attempts, the system may determine that the location is unrecognized. A location may be a city, a state, a country, a geographic region and/or the like. For example, a user may have accessed the user's email account for the past six months from a location in the United States. If a login request for the user's account originates from a country other than the United States, the request may be identified as risky.

As another example, a login request from an unrecognized computing device (i.e., a computing device that has not previously accessed the account) may be identified as risky. A service provider may monitor computing devices from which a login request originates. If a request originates from a computing device that has not previously accessed the account, the request may be identified as being risky.

In an embodiment, a login request may be identified as risky if it is made in connection with multiple failed login attempts to an account before the correct access information is provided. The occurrence of multiple failed login attempts may be indicative of a hijacker or hacker trying to impermissibly access an account.

Referring back to FIG. 2, the system may present 202 a user with a list of previous login requests to the user's account over a period of time. The list may include login requests that the system identified as risky. In an embodiment, the system may present 202 a user with a list of previous login requests upon a successful login to the account by the user. For example, the system may present 202 a list of previous login requests to a user after the user has provided the correct login credentials, answers to any security questions, and/or the like.

In an embodiment, at least a portion of information associated with one or more of the previous login requests may be presented to a user. Such information may include, for example, the IP address from which the request is made, a timestamp associated with the request, and a domain name associated with the request. Table 1 illustrates example previous login requests and associated information that may be presented 202 to a user according to an embodiment.

TABLE 1

| Request | IP Address | Timestamp | Location |
|---|---|---|---|
| 1 | 22.214.111.45 | Jun. 13, 2013 10:24 AM | New York, NY |
| 2 | 193.65.81.12 | Jun. 16, 2013 2:35 AM | Houston, TX |
| 3 | 22.214.111.45 | Jun. 16, 2013 1:04 PM | New York, NY |

The system may prompt the user to provide feedback regarding one or more of the presented login requests. For example, the system may ask the user to indicate whether a previous login request is authorized by the user or unauthorized by the user. A user may elect whether or not to provide feedback. If the user elects to provide feedback, the user may do so by selecting an icon, a button, a hyperlink and/or the like associated with the feedback that the user wants to provide. Additional and/or alternate feedback mechanisms may be used within the scope of this disclosure.

In an embodiment, the system may receive 204 the feedback provided by the user, and may incorporate the feedback into the record associated with the account. Table 2 illustrates an example record associated with an account according to an embodiment.

TABLE 2

| Request | IP Address | Timestamp | Location | System Designation | User Feedback |
|---|---|---|---|---|---|
| 1 | Address 1 | Jun. 13, 2013 10:24 AM | New York, NY | Risky | Authorized |
| 2 | Address 2 | Jun. 16, 2013 2:35 AM | Houston, TX | Risky | Unauthorized |
| 3 | Address 3 | Jun. 16, 2013 1:04 PM | New York, NY | Risky | Authorized |

Periodically, the system may evaluate 206 IP addresses associated with login requests that the system has identified as risky. The system may evaluate 206 IP addresses across multiple user accounts according to an embodiment. For example, the system may evaluate all risky IP addresses regardless of to which accounts login requests originating from these IP addresses were targeted.

In an embodiment, the system may evaluate 206 IP addresses by identifying 208 one or more risky IP addresses. The system may identify 210 all user feedback for each identified IP address. Table 3 illustrates example identified IP addresses and associated user feedback according to an embodiment.

TABLE 3

| IP Address | System | U1 | U2 | U3 | U4 | U5 | U6 | U7 | U8 | U9 | U10 |
|---|---|---|---|---|---|---|---|---|---|---|---|
| Address 1 | Risky | A | A | A | A | A | A | A | A | A | A |
| Address 2 | Risky | A | U | U | U | A | U | U | A | U | A |
| Address 3 | Risky | U | U | U | U | U | U | U | U | U | U |
| Address 4 | Risky | A | A | U | A | A | A | U | A | U | A |
| Address 5 | Risky | A | U | U | U | A | A | U | A | A | A |

As illustrated by Table 3, users U1-U10 may indicate whether an IP address is authorized (A) or unauthorized (U). For example, user U1 indicated that Address 2 is authorized. However, user U2 indicated that the same IP address is unauthorized.

In an embodiment, a proportion of users who identify an IP address as unauthorized may be determined 212 for one or more identified IP addresses. The proportion value may be equal to the ratio of users who identified an IP address as unauthorized to the total number of users who provided feedback about the IP address. Table 4 illustrates example proportions that correspond to the IP addresses and feedback illustrated in Table 3 according to an embodiment.

TABLE 4

| IP Address | System | U1 | U2 | U3 | U4 | U5 | U6 | U7 | U8 | U9 | U10 | Proportion |
|---|---|---|---|---|---|---|---|---|---|---|---|---|
| Address 1 | Risky | A | A | A | A | A | A | A | A | A | A | 0.00 |
| Address 2 | Risky | A | U | U | U | A | U | U | A | U | A | 0.60 |
| Address 3 | Risky | U | U | U | U | U | U | U | U | U | U | 1.00 |
| Address 4 | Risky | A | A | U | A | A | A | U | A | U | A | 0.30 |
| Address 5 | Risky | A | U | U | U | A | A | U | A | A | A | 0.40 |

As illustrated by Table 4, the proportion of users who identified Address 2 as an unauthorized address may be equal to 0.60 (6:10). Similarly, since all users identified Address 3 as an unauthorized address, its proportion value may be equal to 1.00.

In an embodiment, the system may label 214 one or more IP addresses based on the associated proportion. If a proportion value equals or exceeds a threshold value, the system may apply one label to the IP address. But if the proportion value does not equal or exceed the threshold value, the system may apply a different label to the IP address. For example, a threshold value may be equal to 0.55. An IP address having a proportion value less than 0.55 may be assigned a label of "safe", whereas an IP address having a proportion value that equals or exceeds 0.55 may be assigned a label of "unsafe." Additional and/or alternate threshold values and/or labels may be used within the scope of this disclosure.

Table 5 illustrates example labels associated with the IP addresses in Table 4 based on a threshold value of 0.55 according to an embodiment.

TABLE 5

| IP Address | System | U1 | U2 | U3 | U4 | U5 | U6 | U7 | U8 | U9 | U10 | Proportion | Label |
|---|---|---|---|---|---|---|---|---|---|---|---|---|---|
| Address 1 | Risky | A | A | A | A | A | A | A | A | A | A | 0.00 | Safe |
| Address 2 | Risky | A | U | U | U | A | U | U | A | U | A | 0.60 | Unsafe |
| Address 3 | Risky | U | U | U | U | U | U | U | U | U | U | 1.00 | Unsafe |
| Address 4 | Risky | A | A | U | A | A | A | U | A | U | A | 0.30 | Safe |
| Address 5 | Risky | A | U | U | U | A | A | U | A | A | A | 0.40 | Safe |

In an embodiment, one or more other considerations may be evaluated in determining a label for an IP address. These considerations may include, for example, a minimum number of users who provided feedback, a minimum number of distinct days on which login requests occurred, whether feedback was provided by users who may be related in some way and/or the like.

In an embodiment, if one or more users from a certain geographic location, IP address range or that share one or more other common characteristics provide feedback, while one or more users from another geographic location, different IP addresses or a different IP address range or that do not share one or more other common characteristics provide opposite feedback, then an IP address may be labeled differently for each user group. For example, if users on the East coast indicate that an IP address is safe but users on the West coast indicate that the same IP address is unsafe, then the IP address may be labeled safe for users on the East coast and may be labeled unsafe for users on the West coast.

In an embodiment, if user feedback is provided during a short time window, such as a time period that is below a threshold value, then the feedback may be flagged as potentially being provided in bulk by bots or other nefarious actors. As such, this feedback may not be trusted in the same way or carry as much weight as if the feedback was provided over a longer time window.

In various embodiments, if feedback is provided by only a small sample of users or a number of users that falls below a threshold value, then the determined label may be considered weaker than if the feedback had been provided by a larger group of users. For example, labels such as "safe_weak", "unsafe_weak" and/or the like may be used in such situations.

The system may use the label assigned to an IP address as a factor in deciding whether or not to allow login requests that originate from that IP address. For example, if the system receives a login request from Address 3, the system may see that the address is associated with an unsafe label, and may factor this into its decision as to whether or not to allow the request.

Figure 3:
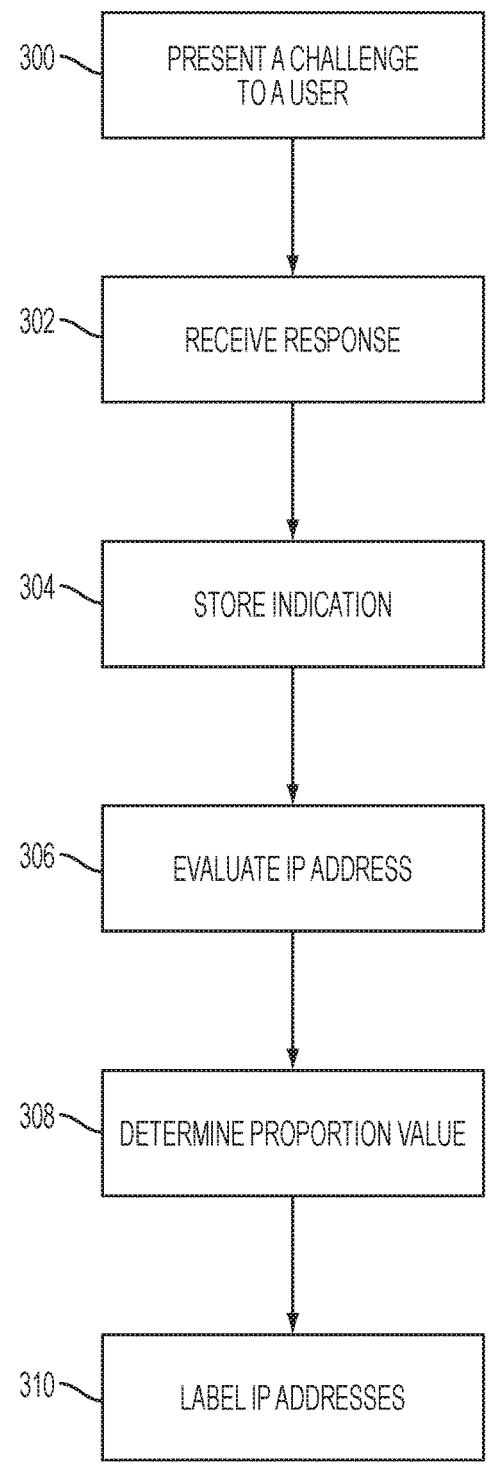
FIG. 3 illustrates a flow chart of an example method of verifying an account login request according to an embodiment.

FIG. 3 illustrates a flow chart of an alternate example method of verifying an account login request according to an embodiment. As illustrated by FIG. 3, the system may present 300 a challenge to a user in response to receiving a login request. A challenge may involve asking a user to provide answers to one or more security questions and/or the like. The system may receive 302 a response to the challenge, and may store 304 an indication in the account's record whether the challenge was successfully completed. For example, upon receiving a login request, the system may ask the user to provide an answer to a security question, such as "What is mother's maiden name?" The system may add an indication of whether the user answered the question correctly or incorrectly in the account record.

In an embodiment, the system may evaluate 306 IP addresses associated with login requests that the system has identified as risky. The system may evaluate 306 IP addresses based on the number of challenges that have been successfully completed from the IP addresses. Table 6 illustrates example IP addresses and indications as to whether challenges associated with various accounts were successfully completed. In Table 6, a "Y" indicates that a challenge was successfully completed and an "N" indicates that a challenge was not successfully completed for accounts (A1-A10).

system may apply a different label to the IP address. For example, a threshold value may equal to 0.55. An IP address having a proportion value less than 0.55 may be assigned a label of "safe", whereas an IP address having a proportion value that equals or exceeds 0.55 may be assigned a label of "unsafe."

As another example, an IP address having a proportion value that exceeds 0.80 may be labeled "safe_strong", an IP address having a proportion value between 0.50-0.80 may be labeled "safe_weak", and an IP address having a proportion value that does not exceed 0.50 may be labeled "unsafe." Additional and/or alternate threshold values and/or labels may be used within the scope of this disclosure.

Table 6 illustrates example labels associated with the IP Addresses assuming a threshold value of 0.55 according to an embodiment.

The system may use the label assigned to an IP address as a factor in deciding whether or not to allow login requests that originate from that IP address. For example, if the system receives a login request from Address 1, the system may see that the address is associated with a safe label, and may factor this into its decision as to whether or not to allow the request.

In situations in which the systems discussed here collect personal information about users, or may make use of personal information, the users may be provided with an opportunity to control whether programs or features collect user information (e.g., information about a user's current location), or to control whether and/or how to receive content that may be more relevant to the user. In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the system.

TABLE 6

| IP Address | System | A1 | A2 | A3 | A4 | A5 | A6 | A7 | A8 | A9 | A10 | Proportion | Label |
|---|---|---|---|---|---|---|---|---|---|---|---|---|---|
| Address 1 | Risky | Y | Y | Y | N | N | Y | N | Y | N | N | 0.50 | Safe |
| Address 2 | Risky | Y | Y | Y | N | Y | N | Y | Y | Y | Y | 0.80 | Unsafe |
| Address 3 | Risky | N | N | N | Y | N | N | N | Y | N | N | 0.20 | Safe |
| Address 4 | Risky | Y | Y | N | Y | N | N | Y | Y | N | Y | 0.60 | Unsafe |
| Address 5 | Risky | N | Y | N | N | Y | Y | Y | N | N | Y | 0.50 | Safe |

In an embodiment, a proportion of successful challenges for an IP address may be determined 308 for one or more identified IP addresses. The proportion value may be equal to the ratio successful challenges to the total number of challenges presented to users of the IP address. For example, as illustrated by Table 6, the proportion value for Address 1 may be equal to 0.50 (5 successful challenges:10 total challenges presented).

Figure 4:
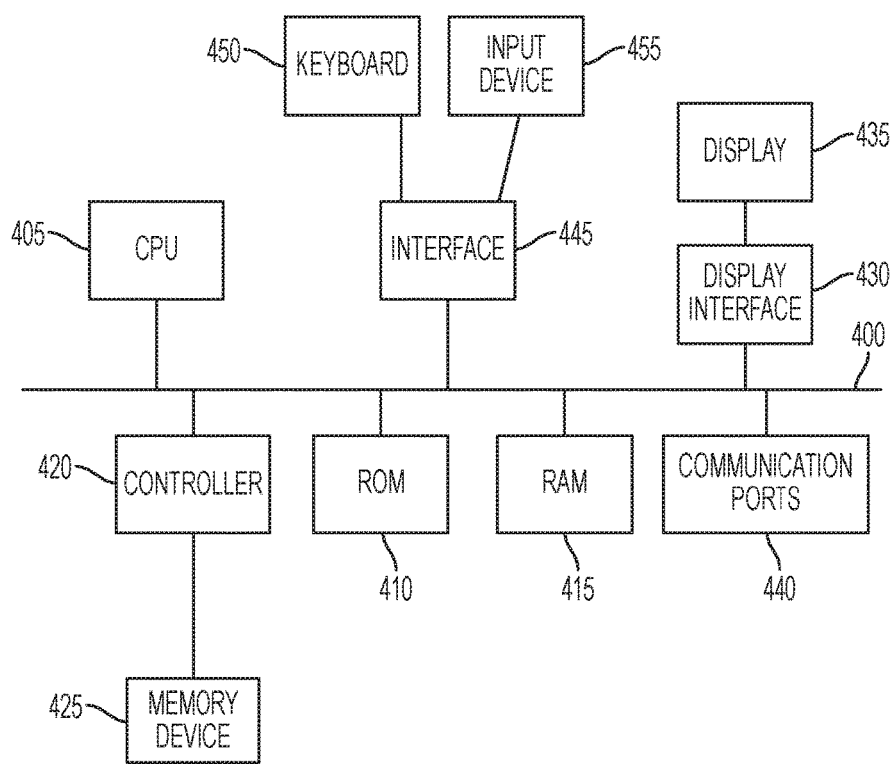
FIG. 4 illustrates a block diagram of example hardware that may be used to contain or implement program instructions according to an embodiment.

In an embodiment, the system may label 310 one or more IP addresses based on the associated proportion. If a proportion value equals or exceeds a threshold value, the system may apply one label to the IP address. But if the proportion value does not equal or exceed the threshold value, the FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible non-transitory computer-readable medium such as a compact disk, a digital disk, flash memory, a memory card, a USB drive, an optical disc storage medium and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communication network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of verifying an account login request, the method comprising:
   identifying, by a computing device, one or more Internet Protocol (IP) addresses as potentially malicious, wherein one or more login requests for one or more accounts were made from the one or more IP addresses; and
   for each identified IP address:
   determining a first value equal to a number of times over a period of time that a challenge presented to a user associated with the IP address was successfully completed by the user, wherein the challenge comprises one or more security questions that are associated with an account to which a login request associated with the identified IP address corresponds,
   determining a second value equal to a total number of times over the period of time that a challenge was presented to the user,
   determining a proportion value associated with the IP address by determining a ratio of the second value to the first value,
   labeling the IP address as safe or unsafe based on at least the proportion value associated with the IP address, and
   maintaining, by the computing device, a list of the IP addresses and corresponding labels.

2. The method of claim 1, wherein identifying one or more IP addresses as potentially malicious comprises identifying an IP address as potentially malicious if it originates from a location from which an associated account has not previously been accessed.

3. The method of claim 1, wherein identifying one or more IP addresses as potentially malicious comprises identifying an IP address as potentially malicious if is made by a computing device that has not previously accessed a corresponding account.

4. The method of claim 1, further comprising:
   receiving a login request for a user account from an IP address;
   determining whether the IP address is included in the list of IP addresses; and
   in response to determining that the IP address is included in the list of IP addresses, determining whether to allow the login request based in part on the label associated with the IP address.

5. A system of verifying an account login request, the system comprising:
   a computing device; and
   a computer-readable storage medium in communication with the computing device, wherein the computer-readable storage medium comprises one or more programming instructions that, when executed, cause the computing device to:
   identify, by a computing device, one or more Internet Protocol (IP) addresses as potentially malicious, wherein one or more login requests for one or more accounts were made from the one or more IP addresses, and
   for each identified IP address:
      determine a first value equal to a number of times over a period of time that a challenge presented to a user associated with the IP address was successfully completed by the user, wherein the challenge comprises one or more questions for the user to answer,
      determine a second value equal to a total number of times over the period of time that a challenge was presented to the user,
      determine a proportion value associated with the IP address by determining a ratio of the second value to the first value,
      label the IP address as safe or unsafe based on at least the proportion value associated with the IP address, and
      maintain a list of the IP addresses and corresponding labels.

6. The system of claim 5, wherein the one or more programming instructions that, when executed, cause the computing device to identify one or more IP addresses as potentially malicious comprise one or more programming instructions that, when executed, cause the computing device to identifying an IP address as potentially malicious if it originates from a location from which an associated account has not previously been accessed.

7. The system of claim 5, wherein the one or more programming instructions that, when executed, cause the computing device to identify one or more IP addresses as potentially malicious comprise one or more programming instructions that, when executed, cause the computing device to identify an IP address as potentially malicious if is made by a computing device that has not previously accessed a corresponding account.

8. The system of claim 5, wherein the computer-readable storage medium further comprises one or more programming instructions that, when executed, cause the computing device to:
- receive a login request for a user account from an IP address;
- determine whether the IP address is included in the list of IP addresses; and
- in response to determining that the IP address is included in the list of IP addresses, determine whether to allow the login request based in part on the label associated with the IP address.

* * * * *